United States Patent [19]
Burrell

[11] 3,765,698
[45] Oct. 16, 1973

[54] VEHICLE STEERING SYSTEM

[75] Inventor: Frank C. Burrell, Orchard Lake, Mich.

[73] Assignee: General Motors Corporation, Detroit, Mich.

[22] Filed: July 13, 1972

[21] Appl. No.: 271,397

[52] U.S. Cl. ............................ 280/96.2 R, 180/43
[51] Int. Cl. .................................................... B60p
[58] Field of Search ................. 280/96.2 R, 96.2 A, 280/95 R, 96; 180/42, 43

[56] References Cited
UNITED STATES PATENTS
| | | | |
|---|---|---|---|
| 1,233,025 | 7/1917 | Chaplain | 280/96 |
| 2,461,775 | 2/1949 | Roos | 280/96.2 |

*Primary Examiner*—Allen N. Knowles
*Attorney*—Warren E. Finken et al.

[57] ABSTRACT

A vehicle steering system adapted to automatically compensate for twist of a wheel supporting axle in a solid axle type suspension arrangement, the steering system including a steering gear on the sprung mass portion of the vehicle, a reciprocating pitman arm on the steering gear, a pair of steering knuckles on one steerable wheel assembly spaced vertically equal distances above and below an axis defined by the solid axle, a pair of control rods attached to the steering knuckles, and a connecting link attached to the control rods and to the pitman arm. The connecting link, control rods, and steering knuckles define an articulated parallelogram the neutral plane of which contains the axle axis and the pitman arm connection so that twisting of the axle effects skewing of the parallelogram without accompanying bodily shiftable movement of the neutral plane.

4 Claims, 3 Drawing Figures

Patented Oct. 16, 1973
3,765,698
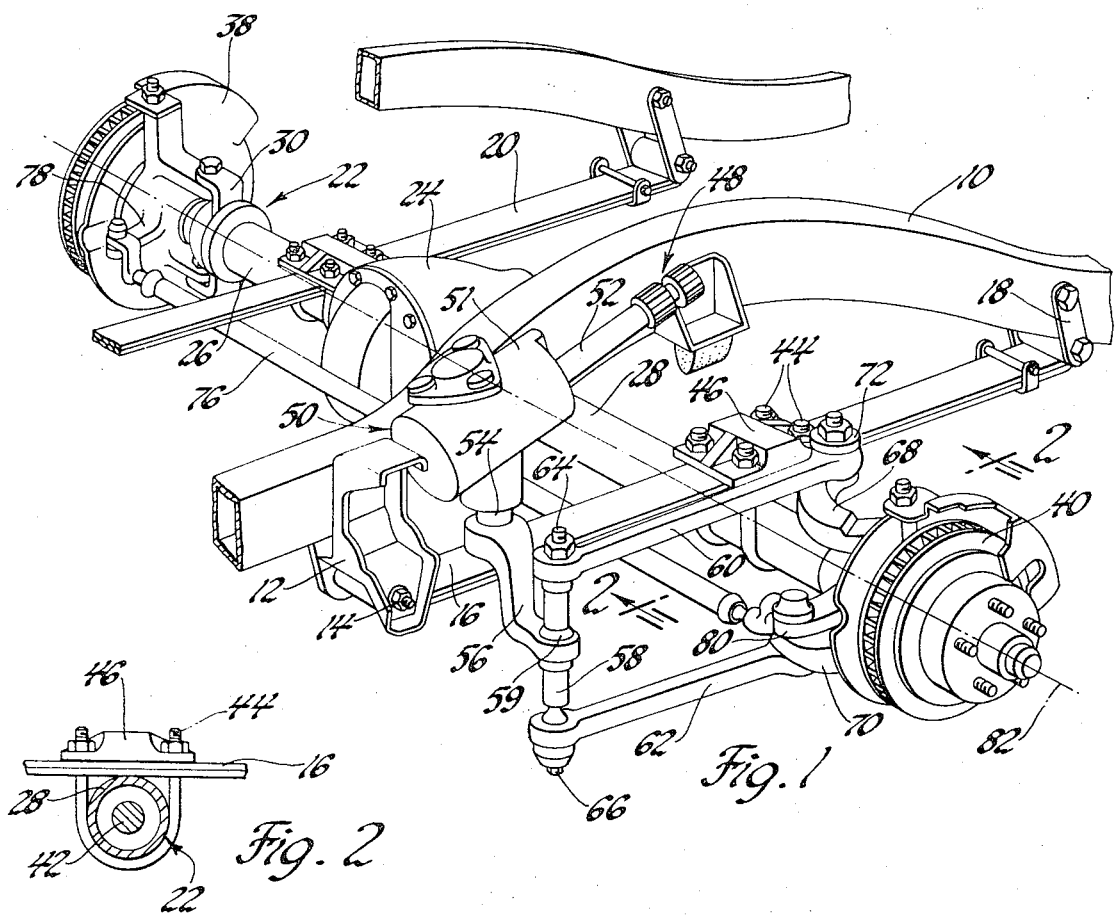
Fig. 1
Fig. 2
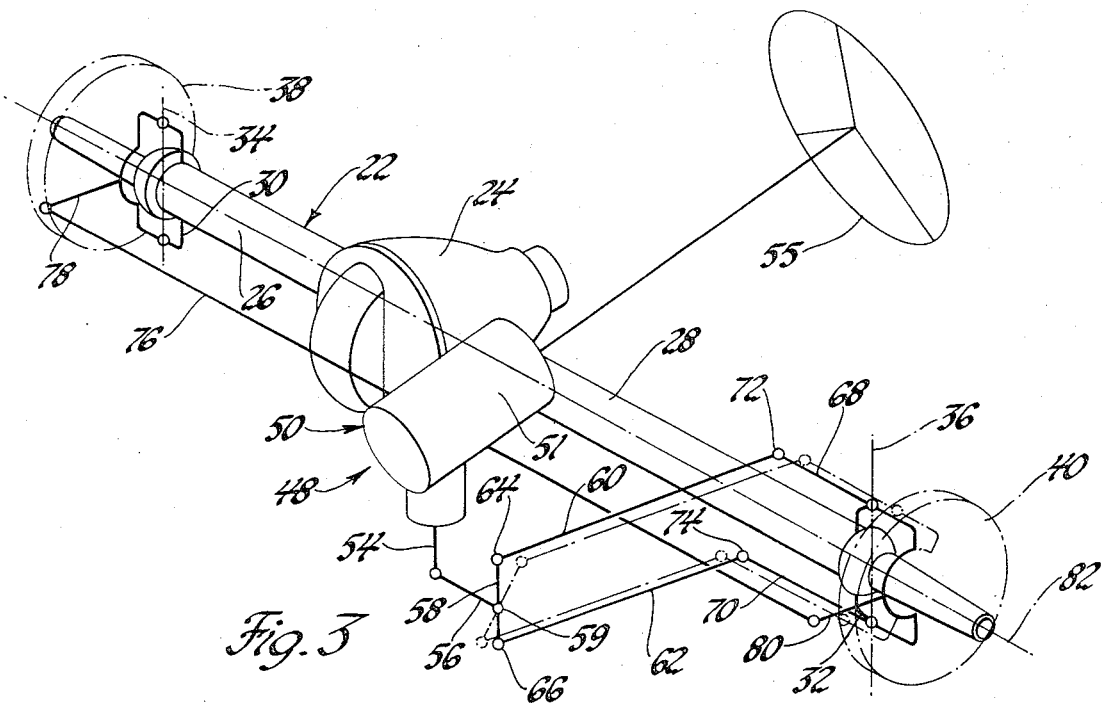
Fig. 3

VEHICLE STEERING SYSTEM

This invention relates generally to vehicle steering systems and more particularly to a steering system which automatically compensates for angular displacement of the wheel supporting axle assembly.

A typical solid axle type vehicle suspension system generally includes a solid axle member, such as an I-beam or a tube, which member is resiliently connected to the vehicle sprung mass, as by leaf type springs, and which rotatably supports at each end of a road wheel assembly. In a solid axle type front suspension each wheel assembly is typically adapted for synchronous pivotal movement about a generally vertical steering axis. For controlling steering pivotal movement, one of the wheel assemblies includes a steering knuckle which is connected to a steering gear pitman arm through a control rod. Since the control rod is of fixed length and normally disposed above the horizontal plane of the axle, any angular displacement or twisting of the axle about its longitudinal axis, as may result from brake torque or from acceleration torque if the steerable wheels are powered, which tends to alter the distance between the steering knuckle and the pitman arm results in some pivotal movement of the wheel assembly about the steering axis. A steering system according to this invention embodies an improved linkage arrangement which automatically compensates for axle twist.

Accordingly, the primary features of this invention is that it provides an improved vehicle steering system. Another feature of this invention is that it provides an improved steering system particularly adapted for use with solid axle type suspension systems wherein a pair of steerable road wheel assemblies are disposed on the ends of a solid axle member which is resiliently connected to the sprung mass portion of the vehicle. Yet another feature of this invention is that it provides an improved vehicle steering system which automatically compensates for axle twist during braking and acceleration. A still further feature of this invention resides in the provision in the steering system of an articulated quadrilateral polygon linkage including dual control rods between the pitman arm and the wheel assembly, the neutral plane of the quadrilateral polygon intersecting both the pitman arm and the longitudinal axis of the axle so that axle twist skews the polygon without initiating steering pivotal movement of the wheel assembly. These and other features of this invention will be readily apparent from the following specification and from the drawings wherein:

FIG. 1 is a fragmentary perspective view of an automobile type front suspension arrangement including a steering system according to this invention;

FIG. 2 is an enlarged sectional view taken generally along the plane indicated by lines 2—2 in FIG. 1; and FIG. 3 is a schematic view of the steering system according to this invention.

Referring now to FIG. 1 of the drawings, thereshown in perspective view is a front suspension arrangement for an automobile type vehicle, the vehicle having a sprung mass portion including a frame having a pair of longitudinally extending, transversely spaced, and rigidly interconnected frame rails, only one rail 10 on the operators side of the vehicle being shown. Generally at the forward end thereof, the rail 10 has attached thereto a bracket 12, the bracket 12 pivotably supporting at 14 the forward end of a leaf spring 16. The rear end of the leaf spring 16 is connected to the rail 10 through a conventional shackle assembly 18. An identical leaf spring 20 is similarly connected to the other rail, not shown.

As seen best in FIGS. 1 and 3, the front suspension arrangement further includes a tube type solid axle assembly designated generally 22. In the embodiment shown the vehicle is of the four wheel drive type wherein each of the four road wheels is powered. Accordingly, the axle assembly 22 includes a differential housing portion 24 and a pair of axle tubes 26 and 28 rigidly connected to the differential carrier portion and projecting laterally from opposite sides thereof. A pair of conventional yokes 30 and 32 rigidly disposed on the outboard ends of respective ones of the axle tubes 26 and 28 define corresponding ones of a pair of steering axes 34 and 36. A pair of wheel assemblies 38 and 40 are pivotably attached to the yokes 30 and 32, respectively, for conventional pivotal movement about corresponding ones of the steering axes 34 and 36.

Rotatably disposed within each of the axle tubes 26 and 28 are axle shafts driven by the engine of the vehicle, not shown, through conventional gearing within the differential housing 24, only axle shaft 42 being shown in FIG. 2. The outboard ends of the axle shafts are connected to rotatably journaled hub portions of the wheel assemblies 38 and 40 through conventional universal joint arrangements, not shown, and are thus effective to transfer driving torque from the engine to the hub portions which, in turn, drive the road wheels. As seen best in FIG. 2, the axle tube 28 is rigidly connected to the leaf spring 16 through a conventional clamp arrangement including a pair of U-bolts 44 and a plate 46, the axle tube 26 being similarly rigidly connected to the leaf spring 20. The leaf springs thus resiliently suspend the sprung mass portion of the vehicle above the axle assembly 22 in a conventional manner.

As seen best in FIGS. 1 and 3, a steering system according to this invention and designated generally 48 is provided to control the pivotal movement of the wheel assemblies about the steering axes and includes a conventional steering gear 50 rigidly attached to the frame rail 10 generally adjacent the bracket 12. The steering gear 50 includes a housing 51 which rotatably supports a worm shaft 52 which, through conventional gearing, is operative to effect rotation of a pitman shaft 54 also rotatably supported on the housing and disposed at approximately 90° to the worm shaft. The worm shaft is drivingly connected to a steering wheel 55 situated within the vehicle so that rotation of the wheel in opposite directions effects simultaneous rotation of the pitman shaft. A pitman arm 56 is rigidly attached to the outboard end of the pitman shaft and is adapted for rotation as a unit with the latter. As is typical, the rotation of the pitman arm and the pitman shaft is limited to an included angle of substantially less than 180° so that the distal end of the pitman arm, while actually traversing an arcuate path of motion, effectively reciprocates fore and aft with respect to the axle assembly 22.

The steering system 48 further includes a connecting link 58 attached to the distal end of the pitman arm 56 at 59. The joint 59 is located generally at the center of the connecting link and is of the socket type which permits limited universal movement of the connecting link relative to the pitman arm. A pair of longitudinally extending control rods 60 and 62 are hinged or articulately connected to the opposite ends of the connecting link 58 through conventional socket type joints 64 and 66. The wheel assembly 48 has rigidly projecting therefrom toward the longitudinal center plane of the vehicle a pair of steering knuckles 68 and 70 vertically spaced equal distances above and below the tube 28 and rotatable as a unit with the wheel assembly about the steering axis 36. The steering knuckles 68 and 70 are hinged or articulateably connected to the rearward ends of the control rods 60 and 62, respectively, through a pair of socket type joints 72 and 74. Accordingly, as the distal end of the pitman arm 56 reciprocates fore and aft in response to the rotation of the worm shaft 52 the control rods 60 and 62 effect pivotal movement of the wheel assembly 40 about the steering axis 36 through the steering knuckles 68 and 70.

Referring further to FIGS. 1 and 3, a relay rod 76 disposed generally parallel to the axle tubes 26 and 28 is connected at opposite ends to respective ones of a pair of arms 78 and 80 rigidly attached to the wheel assemblies 38 and 40, respectively. The relay rod 76, of course, functions to synchronize pivotal movement of the wheel assemblies about the steering axes in a conventional manner.

The axle assembly 22 is subjected to brake torque about an axis 82 defined by the axle shafts therewithin when the brakes of the vehicle are applied. Further, since the wheel assemblies 38 and 40 are powered, the axle assembly 22 is subjected to acceleration torque about the axis 82 during vehicle acceleration. The torque reaction resisted by the U-bolts 44 and the plates 46 which rigidly maintain the relative positions between the leaf springs and axle tubes 26 and 28. When, however, the brake or acceleration torque is of a relatively substantial magnitude the resilience of the leaf springs permits limited angular displacement or twisting of the entire axle assembly generally about the axis 82, the twisting being accompanied by deformation of the leaf springs into generally S-shaped configurations. The wheel assemblies 38 and 40, of course, are twisted as a unit with the axle assembly 22 through the yokes 30 and 32 so that the upper steering knuckle 68 moves in one direction with respect to the pitman arm while the lower steering knuckle 70 moves in another direction relative to the pitman arm, this condition being illustrated in FIG. 3 in broken lines.

Referring again to FIG. 3, the connecting link 56 and the control rods 60 and 62 define three sides of a parallelogram type quadrilateral polygon with the fourth side being defined by an imaginary line intersecting the centers of socket joints 72 and 74, the parallelogram being articulated or hinged at each corner thereof. The vertical spacing between the joints 72 and 74 is substantially equal to the length of the connecting link 60 and when the wheel assemblies 38 and 40 assume straight ahead positions, FIGS. 1 and 3, the imaginary line intersects the axis 82 generally midway between the joints. Accordingly, the axis 82 and the socket joint 59 lie in a common plane perpendicular to the plane of the parallelogram, the common plane being the neutral plane of the parallelogram.

In operation, as the distal end of the pitman arm 56 reciprocates fore and aft, longitudinal forces are exerted on the control rods 60 and 62. Since the socket joint 59 is disposed midway between the control rods, each rod is equally loaded and the wheel assembly 40 is caused to pivot about the steering axis 36. The relay rod 76, of course, effects similar pivotal movement of the wheel assembly 38 about the steering axis 34.

Under brake or acceleration torque conditions, with the pitman shaft being stationary, the wheel assemblies twist with the axle assembly about the axis 82. Consequently, one of the steering knuckles 68 and 70 is shifted away from the socket joint 59 at the pitman arm while the other is shifted toward the joint. Since the knuckles are vertically spaced equal distances above and below the axis 82, the distances through which the steering knuckles move relative to the socket joint 59 are equal but opposite in direction. Accordingly, the articulated parallelogram is forcibly skewed as shown in broken lines in FIG. 3. At the neutral plane, however, the distance between the socket joint 59 and the transverse vertical plane containing the axis 82 remains unchanged so that no forces are transferred through the control rods which might effect steering pivotal movement of the wheel assembly 40. Thus, the dual control rods between the pitman arm and the wheel assembly function to automatically compensate for the twisting effect of the axle assembly during periods of brake and acceleration torque.

It will, of course, be apparent to those skilled in the art that the connecting link 58 and the imaginary line between the socket joints 72 and 74 need not be equal in length. That is, the only direction which must be met is that the socket joints 64 and 66 be equally spaced from the socket joint 59 and that the socket joints 72 and 74 be vertically spaced equal distances from the axis 82. In this way the location of the neutral axis of the articulated quadrilateral polygon remains unchanged with respect to the pitman arm and the axis 82. It will be further apparent that while the steering gear is shown as disposed forwardly of the axle assembly, other locations are possible without altering the automatic compensation feature of the invention.

Having thus described the invention, what is claimed is:

1. In a vehicle including a sprung mass portion, steering gear means on said sprung mass portion including a control member adapted for generally reciprocating movement for controlling the direction of motion of said vehicle, an axle member resiliently connected to said sprung mass portion, said axle member experiencing limited twist about an axis thereof relative to said sprung mass portion when subjected to torque about said axis, and a pair of steerable wheel assemblies disposed on respective ends of said axle member for pivotal movement about corresponding ones of a pair of steering axes defined by said axle member, the improvement comprising, linkage means defining an articulated quadrilateral polygon, means disposing said linkage means between said control member and one of said wheel assemblies with the neutral plane of said polygon containing said axle axis and the connection between said linkage means and said control member so that bodily shiftable movement of said polygon generally in the plane thereof effects pivotal movement of said one wheel assembly about said steering axis while twisting of said axle about said axle axis skews said polygon without bodily shifting the neutral plane of the latter.

2. In a vehicle including a sprung mass portion, steering gear means on said sprung mass portion including a control member adapted for generally reciprocating movement for controlling the direction of motion of said vehicle, an axle member resiliently connected to said sprung mass portion, said axle member experiencing limited twist about an axis thereof relative to said sprung mass portion when subjected to torque about said axis, and a pair of steerable wheel assemblies disposed on respective ends of said axle member for pivotal movement about corresponding ones of a pair of steering axes defined by said axle member, the improvement comprising, linkage means defining an articulated quadrilateral polygon, means operatively connecting one side of said polygon to one of said wheel assemblies so that bodily shiftable movement of said polygon generally in the plane thereof effects pivotal movement of said one wheel assembly about said steering axis, and axle axis intersecting said one polygon side at the center of the latter when said wheel assembly assumes a straight ahead position, and means articulateably connecting the side of said polygon opposite said one side to said control member at the center of said opposite side so that reciprocating movement of said control member effects bodily shiftable movement of said polygon while twisting of said axle about said axle axis skews said polygon without bodily shifting the neutral plane of the latter.

3. In a vehicle including a sprung mass portion, steering gear means on said sprung mass portion including a control member adapted for generally reciprocating movement for controlling the direction of motion of said vehicle, an axle member resiliently connected to said sprung mass portion, said axle member experiencing limited twist about an axis thereof relative to said sprung mass portion when subjected to torque about said axis, and a pair of steerable wheel assemblies disposed on respective ends of said axle member for pivotal movement about corresponding ones of a pair of steering axes defined by said axle member, the improvement comprising, a pair of steering knuckles rigidly attached to one of said wheel assemblies in vertically spaced relation, equidistant from said axle axis, a pair of control rods, means articulateably connecting one end of each of said control rods to a respective one of said steering knuckles, said axle axis intersecting and generally bisecting a line extending between said articulated connections when said one wheel assembly assumes a straight ahead position, a connecting link, means articulateably connecting the opposite ends of said connecting link to respective ones of said control rods so that said connecting link cooperates with said control rods and with said steering knuckles in defining an articulated quadrilateral polygon adapted to effect pivotal movement of said wheel assembly about said steering axis in response to bodily shiftable movement of said polygon generally in the plane thereof, and means articulateably connecting said connecting link generally at the center thereof to said control member so that reciprocating movement of said control member effects bodily shiftable movement of said polygon while twisting of said axle about said axle axis skews said polygon without bodily shifting the neutral plane of the latter.

4. In a vehicle including a sprung mass portion, a steering gear on said sprung mass portion having a pitman arm operatively associated therewith and adapted for generally reciprocating movement for controlling the direction of motion of said vehicle, a solid axle member, a pair of leaf springs disposed longitudinally on said sprung mass portion, means attaching said solid axle to said leaf springs, said solid axle experiencing limited twist about an axis thereof relative to said sprung mass portion when subjected to torque about said axle axis, and a pair of steerable wheel assemblies disposed on respective ends of said solid axle for pivotal movement about corresponding ones of a pair of steering axes defined by said solid axle, the improvement comprising, a pair of steering knuckles rigidly attached to one of said wheel assemblies in vertically spaced relation equidistant from said axle axis, a pair of control rods, means articulateably connecting one end of each of said control rods to a respective one of said steering knuckles, said axle axis intersecting and generally bisecting a line extending between said articulated connections when said one wheel assembly assumes a straight ahead position, a connecting link, means articulateably connecting the opposite ends of said connecting link to respective ones of said control rods so that said connecting link cooperates with said control rods and with said steering knuckles in defining an articulated parallelogram adapted to effect pivotal movement of said wheel assembly about said steering axis in response to bodily shiftable movement of said parallelogram generally in the plane thereof, means articulateably connecting said connecting link generally at the center thereof to said pitman arm so that reciprocating movement of said pitman arm effects bodily shiftable movement of said parallelogram while twisting of said axle about said axle axis skews said parallelogram without bodily shifting the neutral plane of the latter, and a relay rod disposed between said wheel assemblies for synchronizing pivotal movement of each about the corresponding ones of said steering axes.

* * * * *